US 8,819,361 B2

(12) United States Patent
Leet et al.

(10) Patent No.: US 8,819,361 B2
(45) Date of Patent: Aug. 26, 2014

(54) RETAINING VERIFIABILITY OF EXTRACTED DATA FROM SIGNED ARCHIVES

(75) Inventors: Simon Wai Leong Leet, Redmond, WA (US); Sarjana Bharat Sheth, Redmond, WA (US); Patrick T. O'Brien, Jr., Bellevue, WA (US); Jack R. Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 13/230,630

(22) Filed: Sep. 12, 2011

(65) Prior Publication Data
US 2013/0067180 A1    Mar. 14, 2013

(51) Int. Cl.
*G06F 12/02*    (2006.01)

(52) U.S. Cl.
USPC ........... 711/161; 711/154; 711/156; 707/661; 707/662; 707/665; 707/667; 707/999.204; 713/161; 713/162; 713/187; 713/189

(58) Field of Classification Search
USPC .......... 711/161, 154, 156; 707/661, 662, 665, 707/667, 999.204; 713/161, 162, 187, 189
See application file for complete search history.

(56) References Cited

U.S. PATENT DOCUMENTS

| | | | |
|---|---|---|---|
| 5,933,104 A | 8/1999 | Kimura | |
| 6,105,072 A | 8/2000 | Fischer | |
| 6,353,887 B1 | 3/2002 | Cotugno | |
| 6,629,150 B1 | 9/2003 | Huded | |
| 6,650,261 B2 | 11/2003 | Nelson et al. | |
| 6,700,513 B2 | 3/2004 | McGuire | |
| 6,819,627 B2 | 11/2004 | Obermaier et al. | |
| 7,065,650 B2 | 6/2006 | Collins | |
| 7,131,144 B2 | 10/2006 | Rabin | |
| 7,162,499 B2 | 1/2007 | Lees et al. | |
| 7,383,205 B1 | 6/2008 | Peinado et al. | |
| 7,509,354 B2 | 3/2009 | McGarvey | |
| 7,519,736 B2 | 4/2009 | Parham | |
| 7,574,744 B2 | 8/2009 | Eagle et al. | |
| 7,603,391 B1 | 10/2009 | Federwisch et al. | |

(Continued)

OTHER PUBLICATIONS

Augeri, et al., "An Analysis of XML Binary Formats and Compression", Retrieved at <<http://www.cs.huji.ac.il/~feit/ exp/expcs07/papers/150.pdf>>, Experimental computer science, Jun. 13-14, 2007, pp. 1-11.

(Continued)

*Primary Examiner* — Stephen Elmore
(74) *Attorney, Agent, or Firm* — Tony Azure; Andrew Sanders; Micky Minhas

(57) ABSTRACT

The objects of an archive may be verified with a cryptographic signature stored in the archive. However, when an object is extracted, the authentication involves re-authenticating the entire archive, re-extracting the object, and comparing the extracted object with the current object, which is inefficient or unachievable if the archive is unavailable. Instead, the archive may include a block map signed with the signature and comprising hashcodes for respective blocks of the objects of the archive. When an object is extracted, the signature and block map may also be extracted and stored as objects outside of the archive. The extracted signature and block map may later be verified by authenticating the signature, verifying the block map with the signature, and matching the hashcodes of the block map with those of the blocks of the extracted objects, thus enabling a more efficient and portable verification of extracted object with extracted authentication credentials.

20 Claims, 9 Drawing Sheets

(56) References Cited

U.S. PATENT DOCUMENTS

| | | | |
|---|---|---|---|
| 7,711,958 | B2 | 5/2010 | Carro |
| 7,814,499 | B2 | 10/2010 | Straube et al. |
| 7,877,602 | B2 * | 1/2011 | French et al. ............ 713/163 |
| 7,925,749 | B1 | 4/2011 | Lin et al. |
| 7,933,924 | B2 | 4/2011 | Karlsson et al. |
| 8,024,382 | B2 * | 9/2011 | Evans et al. ............. 707/821 |
| 8,332,635 | B2 * | 12/2012 | Plouffe et al. ............ 713/164 |
| 2001/0038642 | A1 | 11/2001 | Alvarez, II et al. |
| 2003/0070075 | A1 * | 4/2003 | Deguillaume et al. ...... 713/176 |
| 2003/0221105 | A1 | 11/2003 | Bajaj |
| 2005/0041955 | A1 | 2/2005 | Beuque |
| 2005/0050332 | A1 | 3/2005 | Serret-Avila et al. |
| 2005/0097113 | A1 | 5/2005 | Peterson |
| 2006/0117307 | A1 | 6/2006 | Averbuch et al. |
| 2006/0136365 | A1 | 6/2006 | Kedem et al. |
| 2007/0050424 | A1 * | 3/2007 | Basin et al. ............. 707/200 |
| 2007/0050431 | A1 | 3/2007 | Vaidya et al. |
| 2007/0220261 | A1 | 9/2007 | Farrugia et al. |
| 2007/0240147 | A1 | 10/2007 | Bernabeu-Auban et al. |
| 2008/0133928 | A1 | 6/2008 | Torrubia et al. |
| 2008/0229111 | A1 | 9/2008 | Paya |
| 2009/0106549 | A1 | 4/2009 | Mohamed |
| 2010/0017424 | A1 | 1/2010 | Hughes |
| 2011/0029492 | A1 | 2/2011 | Vella |
| 2013/0067237 | A1 * | 3/2013 | Huang et al. ............. 713/189 |
| 2013/0067587 | A1 * | 3/2013 | Leet et al. .............. 726/26 |

OTHER PUBLICATIONS

Brisaboa, et al., "A compressed self-indexed representation of XML documents", Retrieved at <<http://www.dcc.uchile.cl/~gnavarro/ps/ecdl09.pdf>>, Proceedings of 13th European conference on Research and advanced technology for digital libraries, 2009, pp. 273-284.

Shi; et al., "eSign: An Enterprise Portal for Secure Document Management"—Published Date: Aug. 15-17, 2005 Proceedings: Information Reuse and Integration, Conf, 2005, pp. 481-486 http://ieeexplore.ieee.org/stamp/stamp.jsp?tp=&arnumber=1506520.

Fu, Kevin E., "Integrity and Access Control in Untrusted Content Distribution Networks", Retrieved at <<http://pdos.csail.mit.edu/papers/fu-phd-thesis.pdf>>, Sep. 6, 2005, pp. 1-143.

"ECMA 376-2: Open Packaging Conventions, section 12 Digital Signatures", Retrieved at <<http://www.ecma-international.org/publications/files/ECMA-ST/Office Open XML 1st edition Part 2 (PDF).zip>>, Open Packaging Conventions, Dec. 2006, pp. 1-124.

"ZIP File Format Specification", Retrieved at <<http://www.pkware.com/documents/casestudies/APPNOTE.TXT>>, Retrieved Date: Jun. 21, 2011, pp. 1-45.

Cicchetti, et al., "A Model Driven Approach to Upgrade Package-Based Software Systems", Retrieved at <<http://upsilon.cc/~zack/research/publications/enase2009-upgrade.pdf>>, Communications in Computer and Information Science, Nov. 2010, pp. 262-276.

Robert, et al.; "New Algorithms for Random Access Text Compression". In Proceedings of the Third International Conference on Information Technology: New Generations (ITNG'06). http://ieeexplore.ieee.org/xpl/login.jsp?tp=&arnumber=1611578&isnumber=33849&url=http%3A%2F%2Fieeexplore.ieee.org%2Fxpls%2Fabs_all.jsp%3Farnumber%3D1611578%26isnumber%3D33849 Published Date: Apr. 24, 2006 pp. 6.

Yiannis, et al; "Compression Techniques for Fast External Sorting". Published in VLDB Journal vol. 6 No. 2 http://goanna.cs.rmit.edu.au/~jz/fulltext/vldbjyz.pdf Published Date: Apr. 1, 2007 pp. 45.

"Multi-part Gzip File Random Access (in Java)". http://www.developerit.com/2010/06/03/multi-part-gzip-file-random access-(in-java) Published Date: Aug. 4, 2009 pp. 3.

Gailly, et al.; "zlib 1.2.5. Manual" http://www.zlib.net/manual.html Published Date: Apr. 19, 2010 pp. 26.

* cited by examiner

RETAINING VERIFIABILITY OF EXTRACTED DATA FROM SIGNED ARCHIVES

BACKGROUND

Within the field of computing, many scenarios involve an archive comprising a set of one or more objects (e.g., files, media objects, database records, or email messages), possibly including other features, such as compression, encryption, random accessibility, revision tracking, and a hierarchical organization. In many such scenarios, the archive includes security verifiers that may be used to verify the contents of the archive. As a first example, a hashing algorithm may enable a hashcode to be calculated as a value derived from the contents of the stored data at the time that the archive was created. At a later time, the contents of the archive may be tested for consistency by using the same hashing algorithm to calculate a current hashcode value for the archive and comparing the two values. Because any change in the data comprising the archive results in a different calculated hashcode, a failed comparison indicates a change somewhere in the data, while a successful comparison indicates a consistent object. In some cases, a change in the object may occur in an arbitrary manner (e.g., data corruption, damage to the physical medium containing the object, or an error in the reading or writing of the object), but in other cases, the change may be caused by a second user who has maliciously changed the object. Therefore, it may be desirable to design the archive to render changes unavoidably detectable. For example, the hashcode may be cryptographically signed with a self-verifying signature, and the signature may be added to the archive. A user who receives the archive may verify the integrity of the signature (e.g., against a public key corresponding to a private key with which the archive was signed), the integrity of the hashcode signature, and the correspondence of the hashcode with the contents of the archive. The failure of any of these verifications or the absence of these authentication items may indicate an intended or inadvertent alteration of the archive, while a success of these verifications may verify the integrity of the archive with a high degree of confidence.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

An archive may comprise many objects, an archive hashcode, and a signature that verifies the archive hashcode, and may therefore enable the verification of the entire archive using the original signature. However, it may become difficult to maintain that verification when objects are extracted from the archive. Such verification may be achieved by re-verifying the archive with the original signature, re-extracting the object, and comparing the object extracted from the archive with the object outside of the archive. However, this verification may be inefficient (e.g., involving the re-verification of the entire archive, which may be large). Additionally, because the verification of the extracted object involves the verification of the archive, the entire archive has to be retained, even if the object is only a small portion of a large archive. This retention may also inefficient due to the duplicate storing of the object extracted from the archive and within the archive (particularly since the verification is only applicable while the object has not changed). Moreover, if the object is transmitted or moved, the integrity of the object may only be verified against the signature only if the archive remains available. For example, an emailed object may only be verified against the original signature if the original archive is also sent or made available to the recipient.

Presented herein are techniques for preserving the capability of authenticating an object against a signature after extraction from an archive. It may be appreciated that the limitations in such authentication scenarios may arise from the semantic tying of the hashcode to the entire archive, rather than the contents of the archive. While the verification of the entire archive remains a valuable capability, the capability of verifying the objects, within or apart from the archive, may be achieved through some alterations to the generation of the archive and the extraction of objects. When the object is generated, the archive may be segregated into blocks (e.g., blocks representing each object, portions of each object, or portions of the archive). Hashcodes may be calculated for respective blocks of the archive and bundled together into a block map. The block map may be signed with the signature, and the signature and block map may be added to the archive. This signing process may enable several variations in authentication. First, the archive may be verified by extracting the signature and block map; authenticating the signature; verifying the block map (e.g., with a block map hashcode included in the signature); and then matching the current hashcode of every block of the archive with the corresponding hashcode in the block map. However, one or more blocks of the archive may be individually validated (without having to validate the rest of the archive) by matching only the hashcodes of those blocks with the corresponding hashcodes of the block map. Moreover, when an object is extracted from the archive, the signature and block map also may be extracted and associated with the object (e.g., transmitted with the object, repackaged with the object, or stored as separate files of a file system). The signature may still be authenticated and used to verify the block map, and the hashcodes in the block map for the blocks comprising the extracted object(s) may be compared with the current hashcodes of the blocks of the extracted object(s). In this manner, the authentication of the object with the signature and the block map may be preserved when the archive is disposed or inaccessible.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
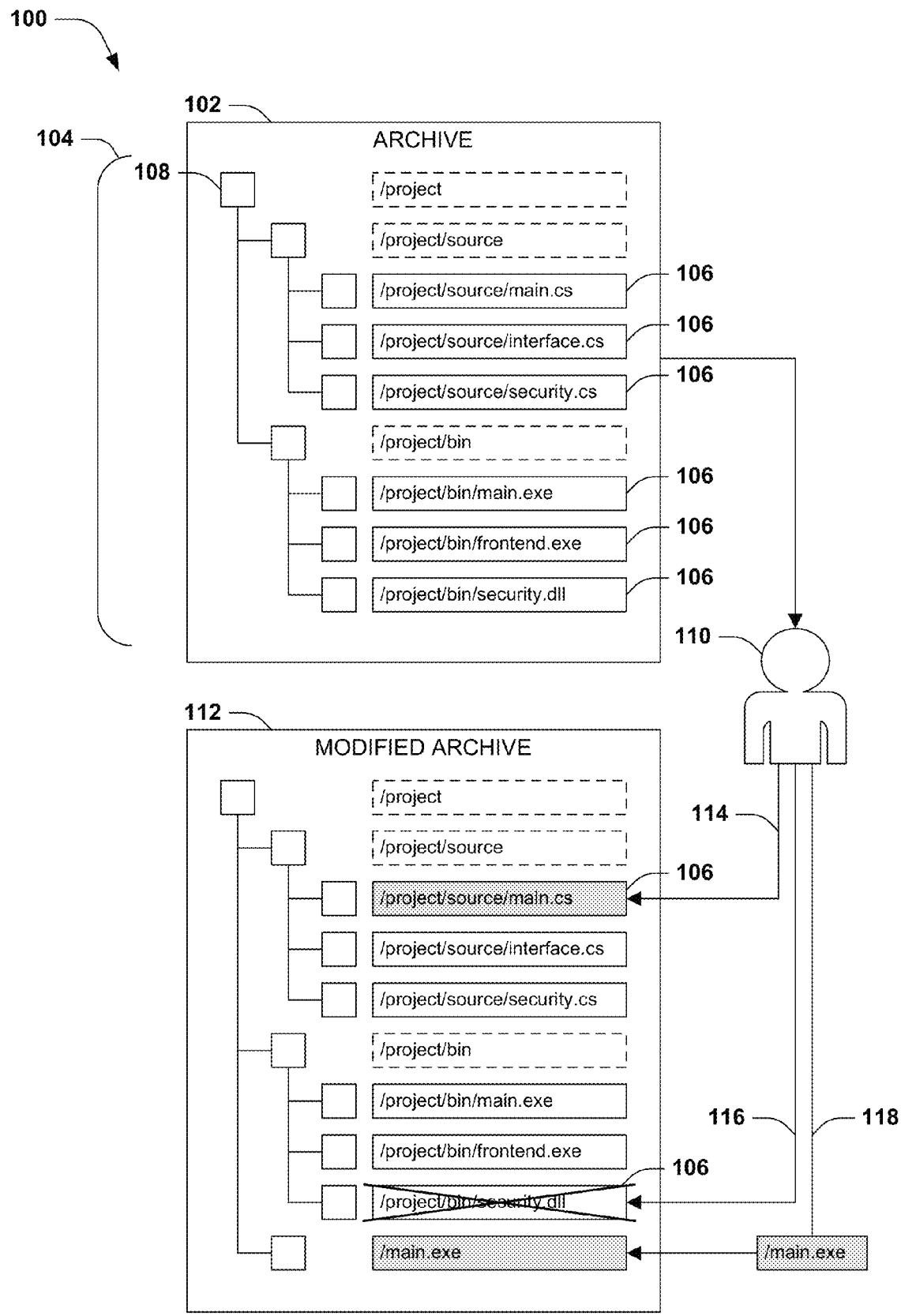
FIG. 1 is an illustration of an exemplary scenario featuring a modification of an archive of objects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the generation of an archive comprising a set of objects. The archive may comprise a single object, a set of objects, or a collection of objects having a structure, such as a hierarchy, and may comprise a variety of objects such as files, database records, media objects, or email messages. The archive may comprise a simple encapsulation of a single object, an aggregation of a set of objects, or an interactive archive, such as a deployment package for the resources of an application, and may also provide other features such as compression, encryption (such that only trusted processes and individuals may examine or access the contents of the archive), random accessibility, the including of metadata, archive update capabilities, and version tracking.

In many such scenarios, it may be desirable to verify that the contents of the archive have not been changed since the archive was generated. Such changes may be inadvertent, e.g., by a failure of the physical medium storing the archive, an error during a read or write to or from the physical medium, or an error during a transmission of the archive over a network or bus. Alternatively, the change may have been intentional; e.g., a malicious process or individual may have changed the contents of the archive, and moreover may endeavor to conceal the change. Therefore, mechanisms may be devised to detect inadvertent and intentional changes to the contents of an archive after generation, and particularly in an unavoidable manner (e.g., such that changes to the archive result in an unavoidable indication of the change, and a preservation of the archive results in an indication of authenticity).

FIG. 1 presents an illustration of an exemplary scenario 100 featuring an archive 102 storing an object set 104 comprising a set of objects 106, such as the modules and files comprising a software project. The objects 106 may be organized in the object set 104 according to a particular organization, such as a hierarchical structure 108 comprising the relative locations of the files within a file system. An individual 110 may modify the archive 102 in various ways, thereby generating a modified archive 112. For example, the individual 110 may cause an addition 114 of an object 106 to the object set 104; a deletion 116 of an object 106 from the object set 104, such as a deletion of the object "/project/bin/security.dll" of the object set as denoted by the "X" symbol depicted over the object; and a modification 118 of an object 106 in the object set 104. For example, the individual 110 may seek to compromise the security of the software project, and may therefore modify the archive 102 to remove security checks, to corrupt the source code, and to include modules featuring malicious instructions. The individual 110 may further alter the modified archive 120 to conceal the alteration in various ways, e.g., by retaining the original modification dates of modified files and of the archive 102, and by padding changed files in order to maintain the file size. In this manner, the archive 102 may be altered to corrupt the object set 104 stored therein.

Figure 2:
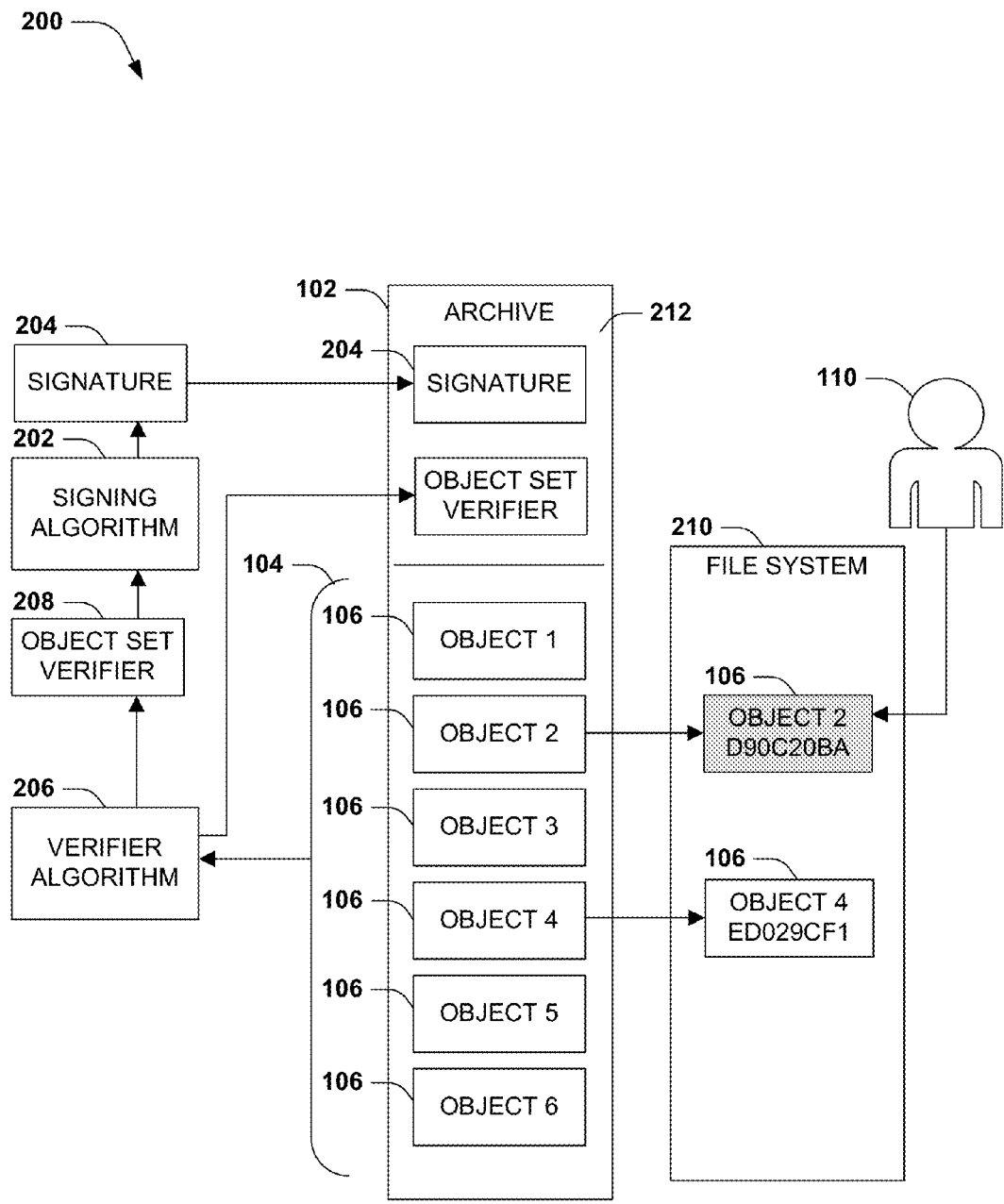
FIG. 2 is an illustration of an exemplary scenario featuring an authentication of an archive of objects in a manner that is tied to the archive.

FIG. 2 presents an illustration of an exemplary scenario 200 featuring the introduction of security measures that may promote the detection of inadvertent or intentional alterations of an archive 102. In this exemplary scenario 200, the archive 102 includes a signature 204 generated with a signing algorithm 202 that may be used to authenticate the contents of the archive 102, such as an implementation of the Rivest-Shamir-Adleman (RSA) encryption algorithm and an asymmetric key pair, where a private key accessible only to the individual generating the archive may be used to sign generate a signature for a data set that may be verified using the public key of the key pair, and that may be difficult to forge without access to the private key. Moreover, the signature 204 may be self-authenticating; e.g., the (freely distributable) public key may enable a verification that the signature 204 is intact and was generated by an individual or process having access to the private key. The signing algorithm 202 may enable a signing of the archive 102 that may facilitate a later determination of the integrity of the archive 102. For example, while generating the archive 102, a device may use a verifier algorithm 206 to generate an object set verifier 208 of the object set 104 stored in the archive 102, such as a hashing algorithm used to generate a hashcode over the entire object set 104. The object set verifier 208 may be signed with the signing algorithm 202, and the object set verifier 208 and the signature 204 may both be included in a reserved portion 212 of the archive 102. At a later time, the integrity of the archive 102 may be tested. For example, the signature 204 may first be extracted from the reserved portion 212 of the archive 102 and may be authenticated using the signing algorithm 202 (e.g., with a public key separately provided by the preparer of the archive 102). Next, the object set verifier 208 may be extracted from the reserved portion 212 of the archive 102, and verified with the signature 204. The verifier algorithm 206 may then be used to generate a current verifier of the contents of the archive 102, and may be compared with the object set verifier 208 extracted from the archive 102. If the signature 204 is authenticated, the object set verifier 208 is verified using the signature 204, and the object set verifier 208 matches the recalculated and current verifier of the object set 104, the archive 102 may be presumed consistent and unmodified since generation. However, the absence of the signature 204 or object set verifier 208 or the failure of any of the authentication and/or verification may indicate that the archive 102 has been compromised in some manner.

While the exemplary scenario 200 of FIG. 2 enables a verification of the integrity of the archive 102, the security mechanisms depicted therein exhibit some limitations. In particular, the object set verifier 208 is tied to the archive 102, or at least to the object set 104 contained therein. For example, the object set verifier 208 is often calculated for the entire object set 104, and may also include in the calculation portions of the structure of the archive 102, such that verifying any portion of the archive 102 with the object set verifier 208 may involve verifying the entirety or a large portion of the archive 102, only to then compare a small portion of the archive 102 to the object 106 of interest. Additionally, when objects 106 are extracted from the archive 102, it may be difficult to continue verifying the integrity of the objects 106 using the signature 204 and object set verifier 208. For example, one or more objects 106 may be extracted from the archive 102 and stored as extracted objects (e.g., files) in a file system 210. The extracted objects 106 may therefore be shared with other users, or may be transmitted over a network (e.g., attached to an email message). However, it may be more difficult to use the security mechanisms of the archive 102 to verify the integrity of the objects 106 (e.g., to determine whether an individual 110 has altered any of the objects 106 extracted into the file system 210). As a first example, the verification mechanism presented in the exemplary scenario 200 of FIG. 2 involves the verification of the object set verifier 208 against the entire object set 104 including the object 106 of interest. However, this verification may be a lengthy process, and may involve the verification of many objects 106 in which the requester of the verification is not interested, or even does not have access. As a second example, the verification involves the retention of the archive 102, because if any part of the archive 102 is inaccessible, the object set verifier 208 cannot be verified. This retention may be inefficient (e.g., the archive 102 may be very large, and the extracted object 106 may comprise only a small portion of the archive 102; or if the extracted object 106 is large, retaining a second copy of the object 106 in the archive 102 may comprise a significant loss of space). As a third example, it may not be permissible to enable a user having access to an object 106 to access the archive 102 if the object set 104 contains objects 106 to which the user does not have access. As a fourth example, even if the signature 204, object set verifier 208, and the object 106 extracted from the archive 102 are intact and not compromised, the verification may fail if an unrelated portion of the archive 102 has been compromised. As a fifth example, if the archive 102 becomes corrupt, lost, inaccessible, or simply cannot be located (e.g., the archive 102 may be available and intact, but a user may simply be unable to identify the archive 102 from which an object 106 was extracted), the object 106 is no longer verifiable. Moreover, a user who is not aware of the relationship therebetween may be unable to determine why the object 106 can no longer be verified. For these and other reasons, the dependence of the verification of an object 106 on the verification of the archive 102 from which the object 106 was extracted may be inefficient or unachievable.

B. Presented Techniques

It may be appreciated that, in the exemplary scenario 200 of FIG. 2, the basis for the dependence of the verification of an object 106 on the verification of the archive 102 from which the object 106 was generated is primarily due to the relationship between the object set verifier 208 and the object set 104; i.e., an object 106 is verified as being identical to an object 106 include in the object set 104 that is verified with the object set verifier 208. This coarse granularity in the authentication process may be ameliorated by enabling an authentication of an object 106 without having to authenticate other objects of the archive 102. However, it may be undesirable to use the signing algorithm 202 to sign each object 106, because the signing process may take a while, and the time and computational resources involved in signing every object 106 of an archive 102 (particularly large archives 102 comprising thousands of objects 106), as well as verifying the integrity of an archive 102 by verifying individual signatures 204 of every object 106 of the archive 102, may be prohibitive. Therefore, it may be advantageous to devise a different mechanism that enables a separate verification of the object 106 apart from the archive 102, without generating a signature 204 of the object 106. As a less significant but nevertheless relevant issue, the signature 204 in the exemplary scenario 200 of FIG. 2 is partly tied to the archive 102 due to its inclusion in the reserved portion 212 of the archive 102, since only archiving utilities that are compatible with the structure of the reserved portion 212 may utilize this information.

Presented herein are techniques for improving the portability of the verifying credentials of an object 106 extracted from an archive 102. In accordance with these techniques, the archive 102 may be segmented into blocks comprising portions of the archive 102 (e.g., 64 kb portions of respective objects 106 of the archive 102). The verifier algorithm 206 may be utilized to generate a block verifier (e.g., a hashcode) of each block of the archive 102. Moreover, rather than signing the contents of the archive 102, the signing algorithm 202 may be used to sign a block map verifier of the block map (e.g., a hashcode of the block map). The signature 204 and the block map may be stored in the archive 102 and used to verify the archive 102. However, the signature 204 and block map may also be extracted (e.g., as separate objects 106 of the object set 104 and stored apart from the archive 102 (e.g., as additional files of the file system 210). The verification of an object 106 may therefore be performed by authenticating the extracted signature 204; by verifying the block map using a block map verifier included in the signature 204; and by verifying that, for respective blocks of the object 106, the current verifier of the block computed with the verifier algorithm 206 (e.g., a current hashcode of the block) matches the corresponding block verifier stored in the block map. In this manner, the signature 204 and block map may be used to verify an object 106 after the object 106, the block map, and the signature 204 are separated from the archive 102, and even if the archive 102 is disposed or compromised.

Figure 3:
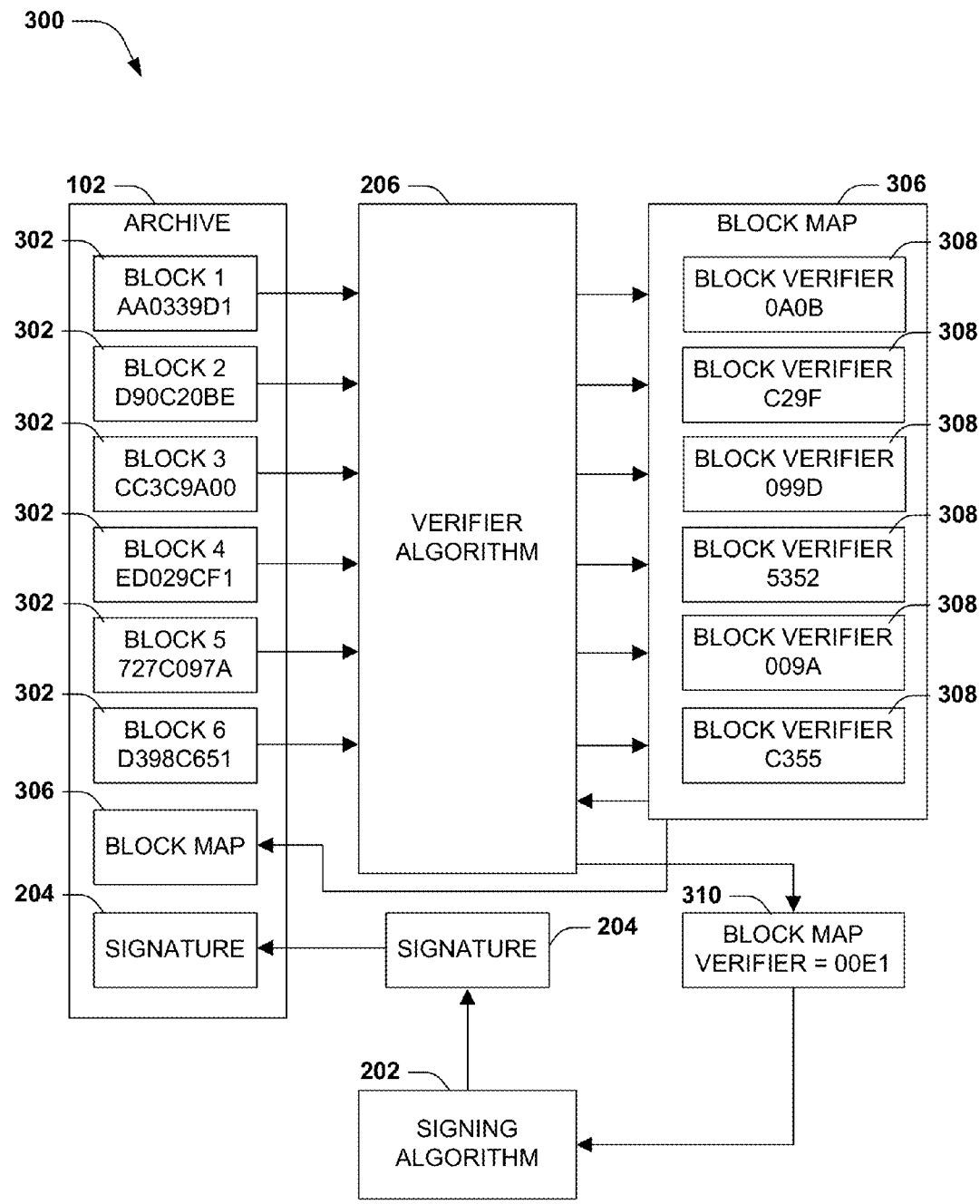
FIG. 3 is an illustration of an exemplary scenario featuring a portable authentication of objects of an archive in accordance with the techniques presented herein.

FIG. 3 presents an illustration of an exemplary 300 featuring the generation of an archive 102 based on the techniques presented herein. In this exemplary scenario 100, an archive 102 is to be generated that stores a set of blocks 302 (e.g., comprising one or more objects 106 of an object set 104). In accordance with the techniques presented herein, the verifier algorithm 206 may be applied to respective blocks 302 to calculate a block verifier 308, such as a hashcode calculated using the original contents of the block 302. The block verifiers 308 may be combined to generate a block map 306. Additionally, the verifier algorithm 206 may be utilized to calculate a block map verifier 310. A signing algorithm 202 may then be applied to the block map verifier 310 to generate a signature 204 that is both self-authenticating and that verifies the contents of the block map 306 according to the block map verifier 310. In particular, the signature 204 may include the block map verifier 310, such that the authentication of the signature 204 also verifies the block map verifier 310, and the block map verifier 310 may be extracted from the signature 204. The archive 102 may then be generated comprising the blocks 302, the block map 306, and the signature 204 to generate the archive 102. Notably, in this exemplary scenario, the block map 306 and signature 204 are included in the archive 102 as objects 106 of the object set 104, rather than in a reserved portion 212 of the archive 102.

Figure 4:
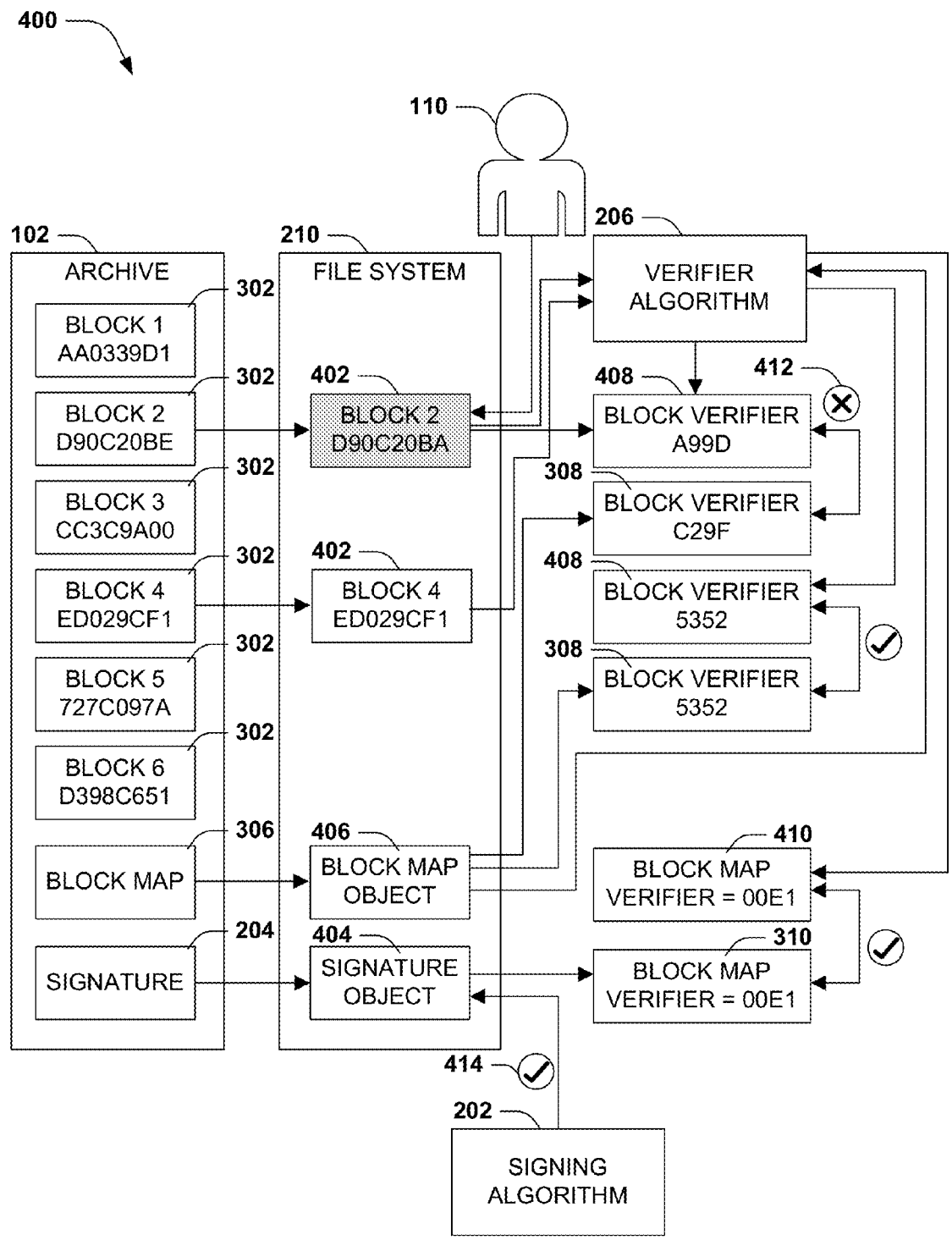
FIG. 4 is an illustration of an exemplary scenario featuring an authentication of objects of an archive after extraction from a signed archive in accordance with the techniques presented herein.

FIG. 4 presents an illustration of an exemplary scenario 400 depicting the use of the archive 102 generated in the exemplary scenario 300 of FIG. 3. In this exemplary scenario 400, two blocks 302 are extracted from the archive 102 and stored as extracted blocks 402 in a file system 210 of a device. In addition, the signature 204 is extracted and stored as a signature object 404, and the block map 306 is extracted and stored as a block map object 406. This extraction may enable the verification of the extracted blocks 402 without reference to the archive 102. For example, upon receiving a request to verify the extracted blocks 402, the device may first authenticate the signature 204 stored in the signature object 404 using the signing algorithm 202, and may then use the verifier algorithm 206 to verify the block map 306 stored in the block map object 406 using the block map verifier 310 stored in the signature object 404 (e.g., by using the verifier algorithm 206 to compute a current block map verifier 410 for the block map object 406, and comparing the current block map verifier 410 with the block map verifier 310 stored in the signature object 404). Next, the verifier algorithm 206 may be used to compute current block verifiers 408 for the current contents the respective extracted blocks 402, and the current block verifiers 408 may be compared with the corresponding block verifiers 308 stored in the block map object 406. Any change to an extracted block 402 results in a mismatch of the stored block verifier 408 and the current block verifier 408 of the extracted block 402. Therefore, the verification may fail due to a missing signature object 404, a failed authentication 414 of the signature object 404, a failed verification 412 of the block map object 406 with the block map verifier 310 stored in the signature object 404, or a failed verification 412 of the current block verifier 408 of an extracted block 402 using the stored block map verifier 308 in the block map object 406 for the extracted block 402. Conversely, a successful authentication 414 of the signature object 404, verification 412 of the block map object 406, and verification 412 of the extracted block 402 may indicate the preserved integrity of the block 402 since extraction from the archive 102, even without reference to or availability of the archive 102.

C. Exemplary Embodiments

Figure 5:
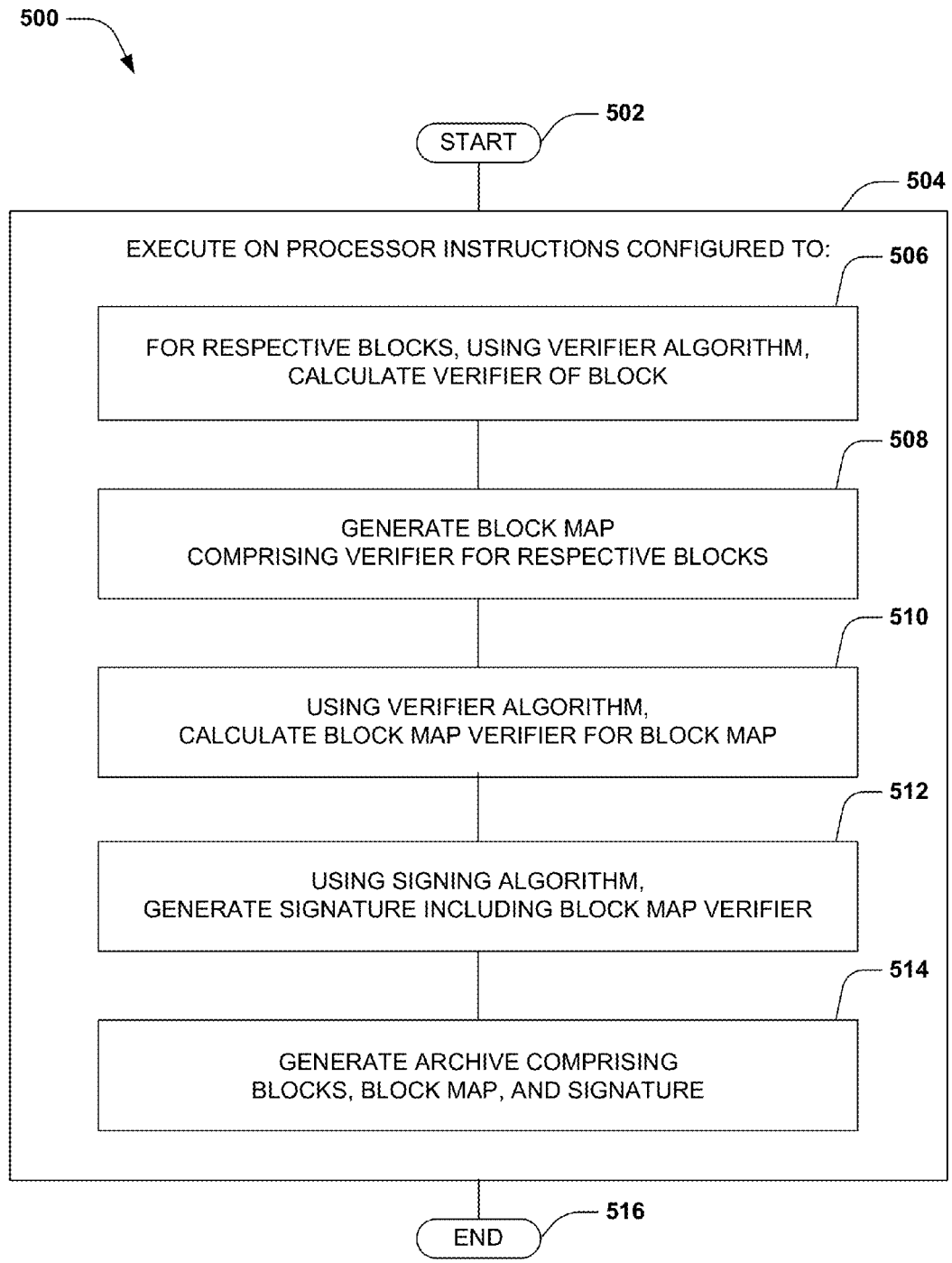
FIG. 5 is a flowchart illustrating an exemplary method of generating an archive comprising an object set, a block map, and a signature of the block map in accordance with the techniques presented herein.

FIG. 5 presents a first embodiment of these techniques, illustrated as an exemplary method 500 of generating an archive 102 comprising at least one block 302. The exemplary method 500 may be performed, e.g., by a device having a processor as well as a verifier algorithm 206 and a signing algorithm 202, and may be implemented, e.g., as a set of instructions stored in a memory component of the device (e.g., a memory circuit, a platter of a hard disk drive, a solid-state memory component, or a magnetic or optical disc) that, when executed by a processor of a device, cause the device to perform the techniques presented herein. The exemplary method 500 begins at 502 and involves executing 504 the instructions on the processor. Specifically, the instructions are configured to, for respective blocks 302, using the verifier algorithm 206, calculate 506 a block verifier 308 of the block 302. The instructions are also configured to generate 508 a block map 306 comprising the block verifiers 308 of respective blocks 302, and, using the verifier algorithm 206, calculate 510 a block map verifier 310 of the block map 306. The instructions are also configured to, using the signing algorithm 202, generate 512 a signature including 204 the block map verifier 310. The instructions are also configured to generate 514 an archive 102 comprising the blocks 302, the block map 306, and the signature 204. In this manner, the instructions achieve the generation of the archive 102 in accordance with the techniques presented herein, and so end at 516.

Figure 6:
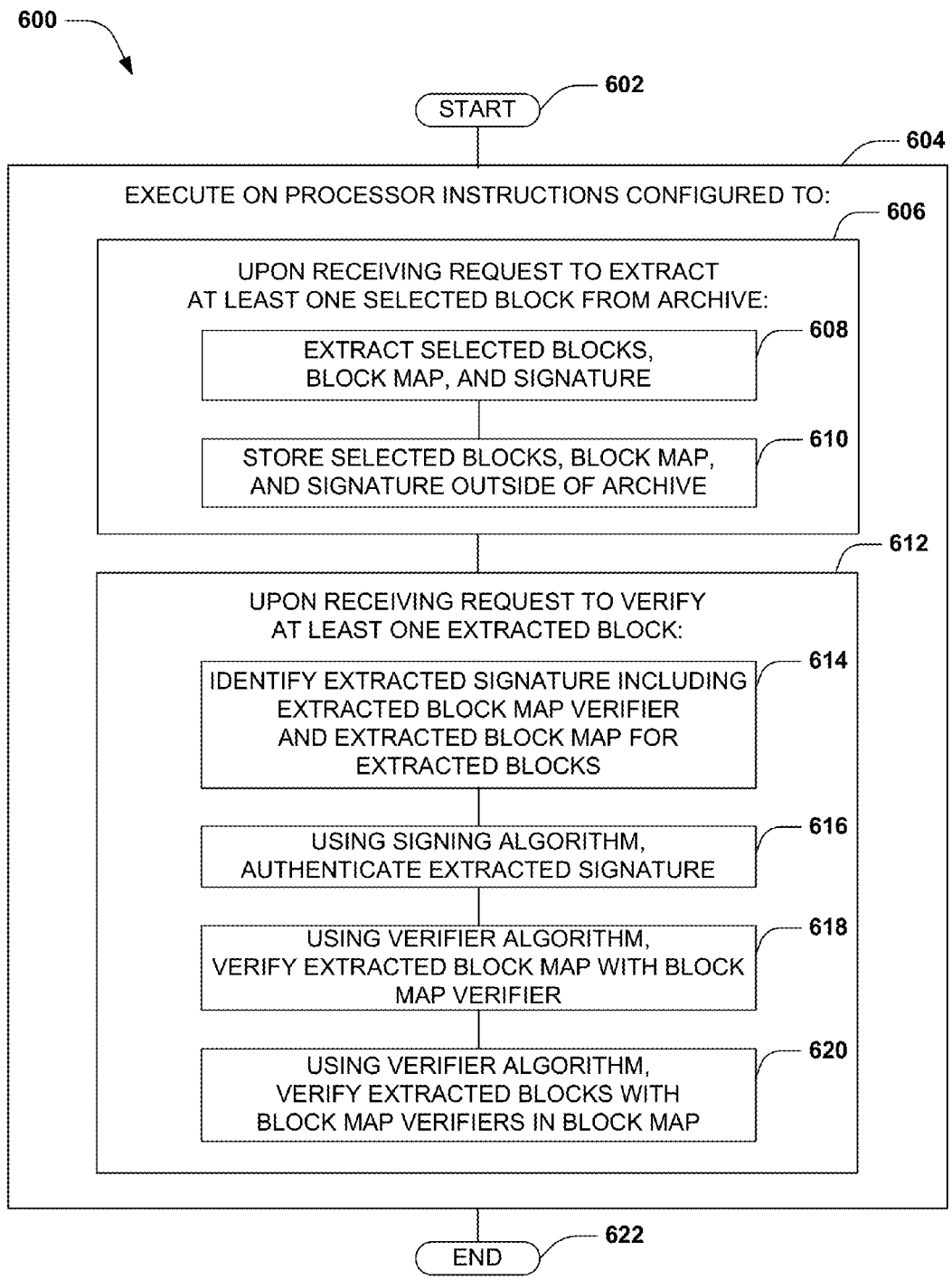
FIG. 6 is a flowchart illustrating an exemplary method of verifying objects extracted from an archive using a signature and a block map also extracted from the archive in accordance with the techniques presented herein.

FIG. 6 presents a second embodiment of these techniques. Illustrated as an exemplary method 600 of verifying the blocks 308 of an archive 102 using a signature 204 and a block map 306 comprising block verifiers 308 of the blocks 302 of the archive 102. The exemplary method 600 may be performed, e.g., by a device having a processor as well as a verifier algorithm 206 and a signing algorithm 202, and may be implemented, e.g., as a set of instructions stored in a memory component of the device (e.g., a memory circuit, a platter of a hard disk drive, a solid-state memory component, or a magnetic or optical disc) that, when executed by a processor of a device, cause the device to perform the techniques presented herein. The exemplary method 600 begins at 602 and involves executing 604 the instructions on the processor. Specifically, the instructions are configured to, upon receiving 606 a request to extract at least one selected block 302 from the archive 102, extract 608 the selected blocks 302, the block map 306, and the signature 204, and store 610 the selected blocks 302, the block map 306, and the signature 204 outside of the archive 102. The instructions are also configured to, upon receiving 612 a request to verify at least one extracted block 402, identify 614 an extracted signature 204 including an extracted block map verifier 310 and an extracted block map 306 for the extracted blocks 402. The instructions are also configured to, using the signing algorithm 202, authenticate 616 the extracted signature 204; using the verifier algorithm 206, verify 618 the extracted block map 306 with the block map verifier 310; and again using the verifier algorithm 206, verify 620 the extracted blocks 402 with the corresponding block verifiers 308 from the extracted block map 306. In this manner, the exemplary method 600 enables the verification of blocks 320 extracted from an archive 102 without reference to the archive 102 according to the techniques presented herein, and so ends at 622.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
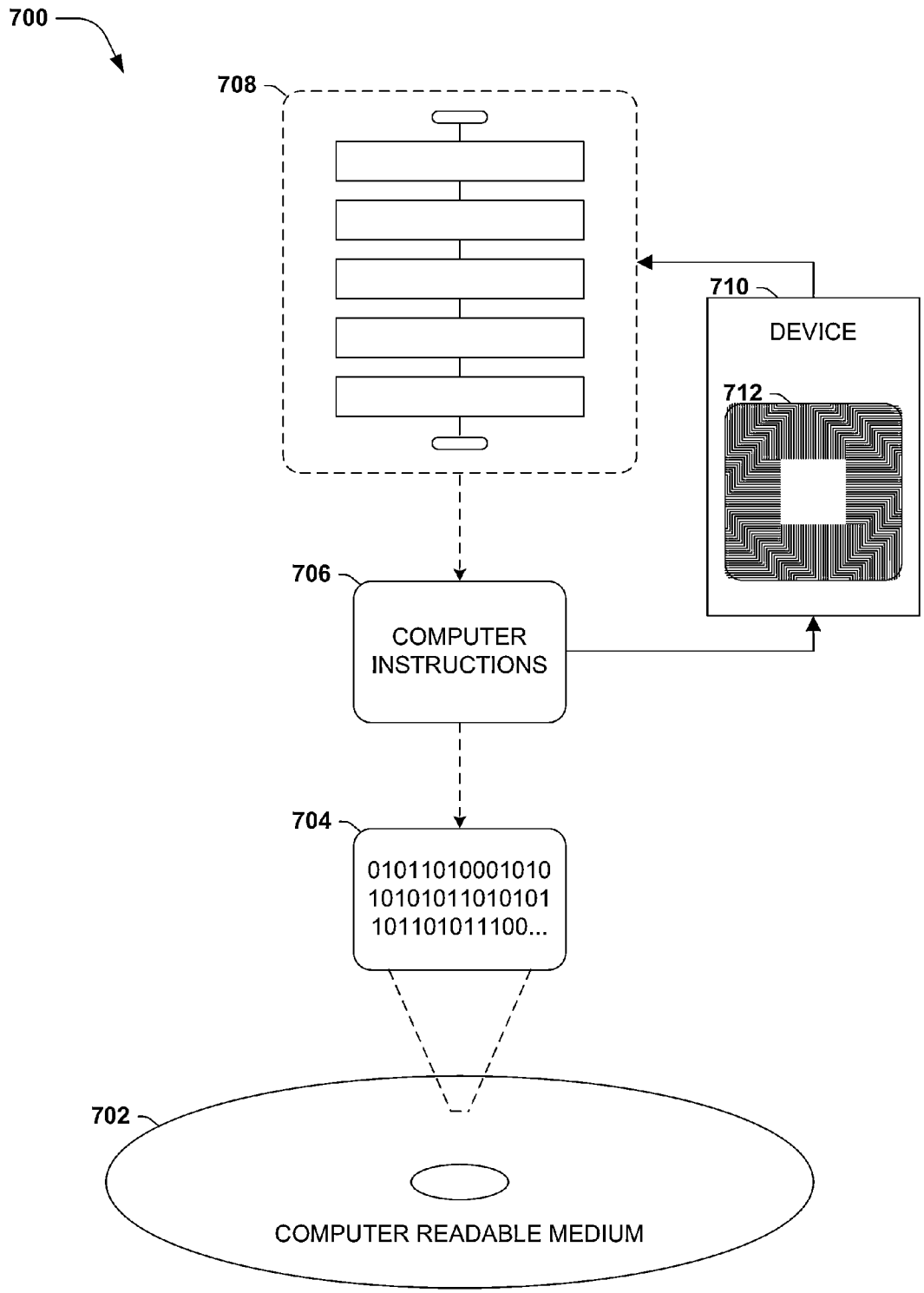
FIG. 7 is an illustration of an exemplary computer-readable medium comprising processor-executable instructions configured to embody one or more of the provisions set forth herein.

An exemplary computer-readable medium that may be devised in these ways is illustrated in FIG. 7, wherein the implementation 700 comprises a computer-readable medium 702 (e.g., a CD-R, DVD-R, or a platter of a hard disk drive), on which is encoded computer-readable data 704. This computer-readable data 704 in turn comprises a set of computer instructions 706 configured to operate according to the principles set forth herein. In one such embodiment, the processor-executable instructions 706 may be configured to perform a method of generating an archive 102, such as the exemplary method 500 of FIG. 5. Alternatively or additionally, the processor-executable instructions 706 may be configured to perform a method of verifying blocks 302 extracted from an archive 102, such as the exemplary method 600 of FIG. 6. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 500 of FIG. 5 and the exemplary method 600 of FIG. 6) to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be implemented in many types of archive generators and/or archive extractors, including standalone executable binaries invoked by users and/or automated processes, an executable binary included with a self-extracting archive 102, a storage system such as a file system or a database system, a server such as a webserver or file server, a media rendering application, and an operating system component configured to compress objects 106 stored on storage devices.

As a second variation of this first aspect, the archives 102 may include many types of objects 106, including media objects such as text, pictures, audio and/or video recordings, applications, databases, and email stores. Additionally, such objects 106 may be stored in volatile memory; on locally accessible nonvolatile media (e.g., a hard disk drive, a solid-state storage device, a magnetic or optical disk, or tape media); or remotely accessed (e.g., via a network). In particular, the techniques presented herein may be useful for accessing objects 106 of archives 102 in scenarios wherein the reduction of seeks and reads within the archive 102 may considerably improve the performance of the accessing. As a first example, where the objects 106 are stored in archives 102 accessed over a network, the latency and comparatively low throughput of the network (particularly low-bandwidth networks) may noticeably improve the performance of the accessing. As a second example, the accessing of objects 106 within archives 102 on a device having limited computational resources (e.g., a portable device having a comparatively limited processor) may be noticeably improved through the use of the techniques presented herein.

As a third variation of this first aspect, these techniques may be used with archives 102 of many different types and specifications, including a uuencode/uudecode format, a tape archive (tar) format, a GNU Zip (gzip) archive format, a CAB archive format, and a ZIP archive format, and a Roshal Archive (RAR) format, or any variant thereof.

As a fourth variation of this first aspect, these techniques may be utilized to compress many types of objects 106 in an archive 102, including text documents, web documents, images, audio and video recordings, interpretable scripts, executable binaries, data objects, databases and database components, and other compressed archives. A particular type of object 106 that may be advantageously stored according to the techniques presented herein is a media object that is to be rendered in a streaming manner. In such scenarios, a user or application may often utilize seek operations to access different portions of the object 106; and as compared with sequential-access techniques, the random access enabled by the techniques presented herein may considerably improve the access rate for various portions (particularly latter portions) of an object 106. Those of ordinary skill in the art may devise many such scenarios wherein the techniques presented herein may be advantageously utilized.

D2. Generating an Archive

A second aspect that may vary among embodiments of these techniques relates to manner of generating an archive 102. As a first variation of this second aspect, many techniques may be utilized to segment the data comprising an archive 102 into blocks 302. As a first example, the data comprising the archive 102 may be apportioned into blocks 302 at regular intervals, such as 64 kb blocks, in a flexible manner (e.g., using Rabin fingerprints), or according to a structure of the archive 102. Alternatively, the archive 102 may comprise discrete units, such an object set 104 including objects 106 organized according to a hierarchical structure 108, and each discrete unit may be segmented into blocks 302 (e.g., each object 106 of the object set 104 may be segmented into a sequence of blocks 302). Moreover, where the data is transformable (e.g., where the data of an archive 102 is compressed and may be transformed into an uncompressed version, or where the data of an archive 102 is encrypted and may be decrypted into a plaintext version), the segmentation into blocks 302 may be applied to either version of the data included in the archive 102 (e.g., to each compressed and/or encrypted object 106) or to the segments of the object set 104 corresponding to respective blocks 302 of the archive 102 (e.g., a verifier may be calculated for each uncompressed and/or decrypted segment of the object 106, and stored with the compressed and/or encrypted block 302 corresponding to the segment).

As a second variation of this second aspect, the signature 204 may be generated to include one or more verifiers, such as the block map verifier 310. For example, the signature 204 may include a protected data region, and the block map verifier 310 may be included therein. Alternatively, the signature 204 may be packaged, associated, or loosely aggregated with such verifiers. As another alternative, the block map 306 may be included in the signature 204 and/or extracted together with the signature 204, or may be included in the archive 102 and/or extracted as a separate object from the signature 204.

As a third variation of this second aspect, many types of signing algorithms 202 may be utilized to generate and/or authenticate many types of signatures 204, including a variant of the Rivest-Shamir-Adleman (RSA) algorithm or a Rabin signature algorithm. Such algorithms may also generate the signature as many types of certifying credentials, such as asymmetric key pairs and digital certificates. Additionally, an embodiment of these techniques may support several signing algorithms 202, and a user generating the archive 102 may be permitted to specify, or even provide, a selected signing algorithm 202 and/or signature 204, and the identity of the selected signing algorithm 202 may be recorded in the archive 102. In a further variation, multiple signatures 204 may be generated with different signing algorithms 202 and stored in the archive 102. In case one signing algorithm 202 is later identified as unreliable (e.g., if a particular set of signing credentials used to create the archive 102 is compromised, or if a mathematical technique is discovered that enables a forgery of signatures 204, such that an individual 110 may modify the archive 102 and generate a signature 204 matching the archive 102 despite not having access to the signing credentials), the archive 102 may instead be authenticated using the signatures 204 generated with other signing algorithms 202. Alternatively or additionally, multiple block maps 306 may be generated having different levels of granularity, covering different object sets, or comprising hashcodes generated with different verifier algorithms 206.

As a fourth variation of this second aspect, many types of verifier algorithms 206 may be utilized to generate many types of verifiers, including many types of hashing algorithms (e.g., MD5, RIPEMD, and SHA-256) generating cryptographic hashcodes. Additionally, an embodiment of these techniques may support several verifier algorithms 206, and a user generating the archive 102 may be permitted to specify, or even provide, a selected verifier algorithm 206. The identity of the selected verifier algorithm 206 may be recorded in the archive 102. As another variation, different verifier algorithms 206 may be used to calculate different verifiers (e.g., a first verifier algorithm 206 calculating the block verifiers 308 of the blocks 302 and a second verifier algorithm 206 calculating the block map verifier 310 of the block map 306). Moreover, it may be advantageous to utilize two or more verifier algorithms 206 to generate two or more block verifiers 308 for each block of the archive 102. As a first example, the verification of any particular data set may be performed using several verifiers; e.g., a verifier of a data set may comprise a combination of a first data set verifier calculated for the data set with a first verifier algorithm 206 and a second data set verifier calculated for the same data set with a second, different verifier algorithm 206, and the verification of the verifier may be performed by verifying the first data set verifier with the first verifier algorithm 206 and the second data set verifier with the second verifier algorithm 206. As a second example, verifiers may be calculated for sets of blocks of different granularities (e.g., a first hashcode for respective sets of ten blocks 114 of respective objects 102, and a second hashcode for respective single blocks 114 of the objects 102), thereby enabling a rapid initial identification of the general areas of an object 102 that have been altered, with a zeroing-in on a changed portion of an object 102 by comparing hashcodes of finer granularities of the blocks 114 of the object 102. As a third example, if one verifier algorithm 206 becomes untrusted (e.g., if an exploit is identified whereby verifiers may be forged, or where changes to data sets may be engineered that do not change the verifier computed by the verifier algorithm 206), the verification may be performed by relying on the verifiers computed by other verifier algorithms.

As a fifth variation of this second aspect, the signature 204 and/or block map 306 may be included in an archive 102 in many ways. For example, the format of the archive 102 may include a reserved portion 212 for such credentials, and the signature 204 and/or block map 306 may be encoded in the reserved portion 212 of the archive. Alternatively, the signature 204 and/or block map 306 may be added to the archive 102 as objects 106 of the object set 104 (e.g., indexed in a central directory of the archive 102 in a similar manner as other objects 106 of the object set 104). This variation may enable the generation of an archive 102 according to the techniques presented herein even if the archiving utility is not compatible with such techniques; e.g., the signature 204 and block map 306 may be generated by a separate utility as separate objects 106, and the archiving utility may be invoked to add these additional objects 106 to the archive 102. Alternatively, the block map 306 may be included in the signature 204; e.g., the signature 204 may feature a signed and protected data section that may conveniently include the block map 306. Moreover, if multiple signatures 204 are generated with different signing algorithms 202, each signature 204 may include a signed copy of the block map 306.

As a sixth variation of this second aspect, the archive 102 may be generated with additional features. As a first such example, the archive 102 may be designed to facilitate random access to the objects 106 of the object set 104, including random access within such objects 106 of the object set 104, while reducing the amount of extraneous reads and seeks involved in achieving such random access. As a second such example, the archive 102 may be designed to support updating and/or versioning, e.g., the addition of objects 106 or the replacement of objects 106 with updated objects 106. As a third such example, where the archive 102 includes a directory (e.g., a central directory that indicates the locations of objects 106 within the archive 102), the archive 102 may include a directory verifier signed with the signature 204 that may be used to verify the integrity of the directory. As a fourth such example, the archive 102 may include an object set verifier 208, e.g., a hashcode or other verifier computed for the entire object set 104 (optionally including the block map 306 and/or a directory), which may enable a determination of whether any portion of the archive 102 has been altered. Those of ordinary skill in the art may devise many ways of generating an archive 102 in accordance with the techniques presented herein.

D3. Verifying Archives and Objects

A third aspect that may vary among embodiments of these techniques relates to the verification of archives 102, objects 106, and extracted blocks 402. As a first variation of this third aspect, the verification may be requested by a user to verify blocks 302 extracted from the archive 102 (e.g., as in the exemplary scenario 400 of FIG. 4). However, verification may also be requested in other circumstances. As a first such circumstance, although an archive 102 may be particularly generated to enable the verification of data extracted from the archive 102 according to the techniques presented herein, a user may request verification of one or more archived blocks 302 stored in an archive 102 using the stored signature 204 and the block map 306. An embodiment may therefore extract the selected blocks 302, the stored signature 204, and the stored block map 306; authenticate the signature 204; using the signature 204 (particularly the block map verifier 308 stored in the signature 204), verify the block map 306; and using the block verifiers 308 stored in the block map 306, verify the contents of the selected blocks 302. As a second such circumstance, a device may store a first version of a particular data set, and the archive 102 may comprise a second version of the data set that including a data set update that may be applied over the first version of the data set to achieve the update. The verification may therefore be requested while extracting (only) the blocks 302 of the archive 102 comprising the data set update. As a third such circumstance, verification may be requested for verification of data extracted from an archive 102 that is streamed over a network. For example, upon receiving a request to extract an object 106 from an archive 102 accessible over a network, an embodiment may be configured to extract a directory of the archive 102, the signature 204, and the block map 306, and to first authenticate the signature 204 and verify the block map 306. The embodiment may then initiate a data stream of the blocks 302 of the archive 102, and may verify respective blocks 302 of the data stream upon receipt over the network.

Figure 8:
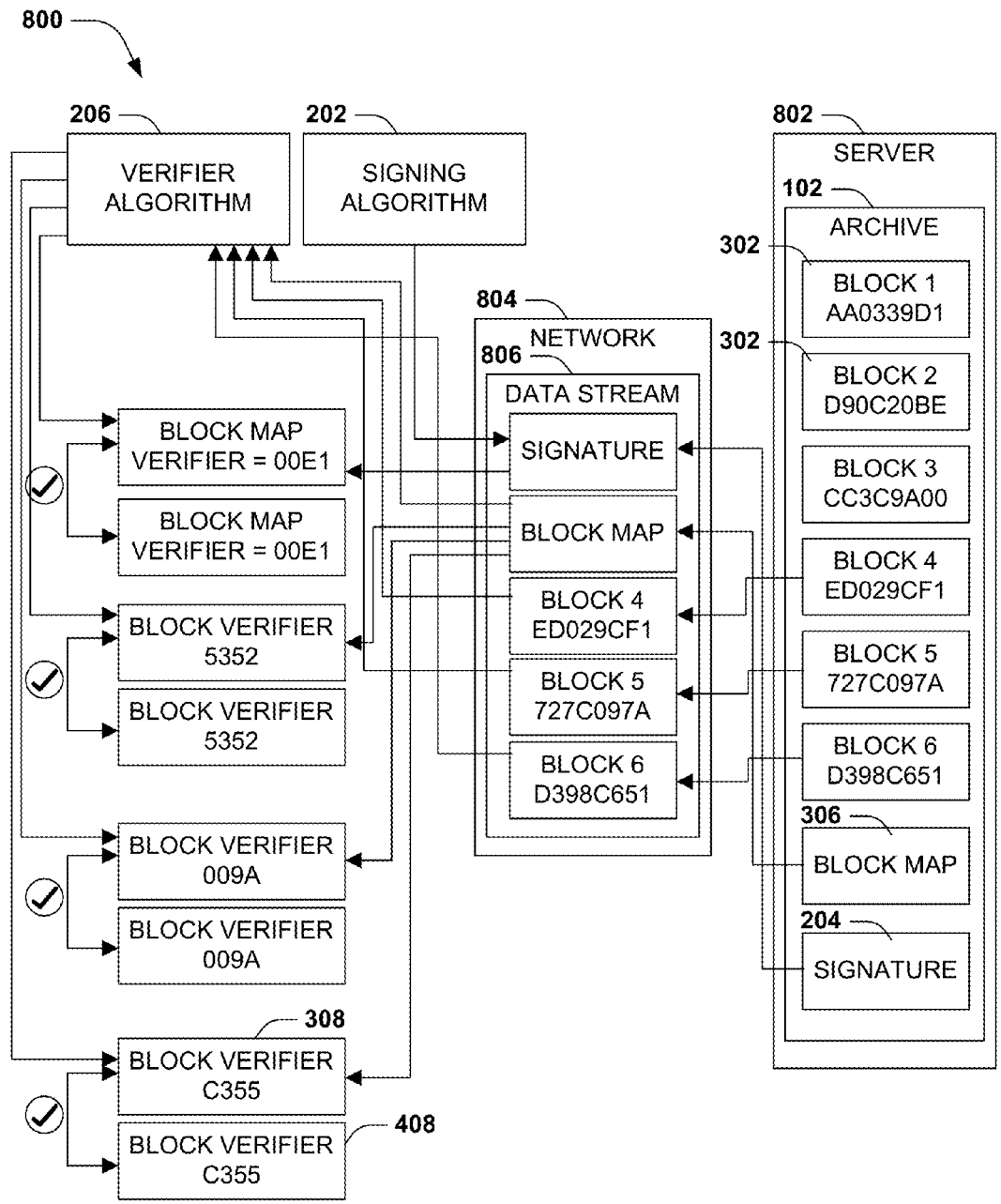
FIG. 8 is an illustration of an exemplary scenario featuring the use of the techniques presented herein to authenticate an object streamed over a network.

FIG. 8 presents an illustration of an exemplary scenario 800 featuring the use of the techniques presented herein to verify the contents of a data stream 806 received from a server 802 over a network. In this exemplary scenario 800, a server 802 is configured to store an archive 102 (e.g., a video recording, an application, or a database or other data set), and may provide streaming access to portions of the archive 102. A device embodying these techniques may initiate a request to access the archive 102, and may do so particularly as a random-access data stream 804 (e.g., a data stream 804 beginning with the fourth block 302 of the archive 102). The server 802 may comply by initiating the data stream 806, but in order to enable the verification of the data stream 806 (e.g., the absence of interference during a man-in-the-middle attack), the server 802 may begin the data stream 806 with the signature 204 and the block map 306 stored in the archive 102. The embodiment may first authenticate the signature 204 using the signing algorithm 202 and verify the block map 306 using the verifier algorithm 206, and upon successful authentication and verification, may receive and verify the blocks 302 of the archive 102 according to the sequence received through the data stream 806. In this manner, the embodiment may apply the techniques presented herein to verify that the blocks 302 of a data stream 806 remain consistent with the corresponding blocks 302 in the archive 102.

As a second variation of this third aspect, the signature 204 and block map 306 may be extracted from and stored apart from the archive 102 in many ways. As a first example, the signature 204 and block map 306, once extracted, may be stored outside of the archive 102 in a reserved credentialing portion of the computing environment (e.g., a protected credential store). As a second example, the signature 204 and block map 306 may simply be stored as objects 106 of the object set 104, e.g., as other files of the file system 210. If the signature 204 and block map 306 are stored in the archive 102 as any other object 106 of the object set 104, these items may be extracted even by extraction utilities that are not configured to recognize and/or utilize such information, but may be utilized by external tools (e.g., separate verification tools that do not interface with the archive 102). Additionally, the signature 204 and block map 306, if stored in a similar manner as the objects 106 that such items verify, may be portable in a similar manner; e.g., these items may be moved, backed up, restored, or transmitted to another device or recipient (e.g., via email) in a similar manner, and possibly together with, the objects 106 verified by such items. Further extensions of these techniques may further facilitate the verification after extraction from the archive 102. As a first such example, the computing environment may store an association of an object 106 and/or extracted block 402 with a corresponding signature 204 and/or block map 306 (e.g., as a semantic relationship between such files in the file system 210). Even if the items are separated, relocated, and/or renamed, the computing environment may nevertheless be able to perform the verification by automatically identifying the association of such items. As a second such example, the extraction may generate a new package comprising the signature 204, the block map 306, and the extracted blocks 402, and may enable this package to expose the objects 106 represented by the extracted blocks 402 in a self-verifying package. Moreover, this self-verifying package may be sent to any recipient as a discrete unit.

As a third variation of this third aspect, the verification of extracted blocks 402 and/or objects 106 may include additional features. As a first example, the archive 102 may include a directory and a directory verifier, and the verification of the blocks 302, objects 106, object set 104, and/or the archive 102 may also involve verifying the directory. As a second example, an entire object set verifier (calculated over the entire object set 104, the block map 306, the directory, and other portions of the archive 102) may be calculated and used to verify the integrity of the entire archive 102. As a third example, a failure of a verification requested by a user may result in a generation and delivery of a notification of the failure, possibly including an identification of the failed verification (e.g., whether the failure was caused by an absence of the signature 204, a failure to authenticate the signature 204, an absence of the block map 306, a failure to verify the block map 306 with the block map verifier 308 stored in the signature 204, or a failure to verify an extracted block 402 with the corresponding block verifier 308. The identification of the particular failure may enable the user to determine the type, nature, and extent of the alteration of the data. Those of ordinary skill in the art may devise many variations in the verification of objects 106 and extracted blocks 402 according to the techniques presented herein.

E. Computing Environment

Figure 9:
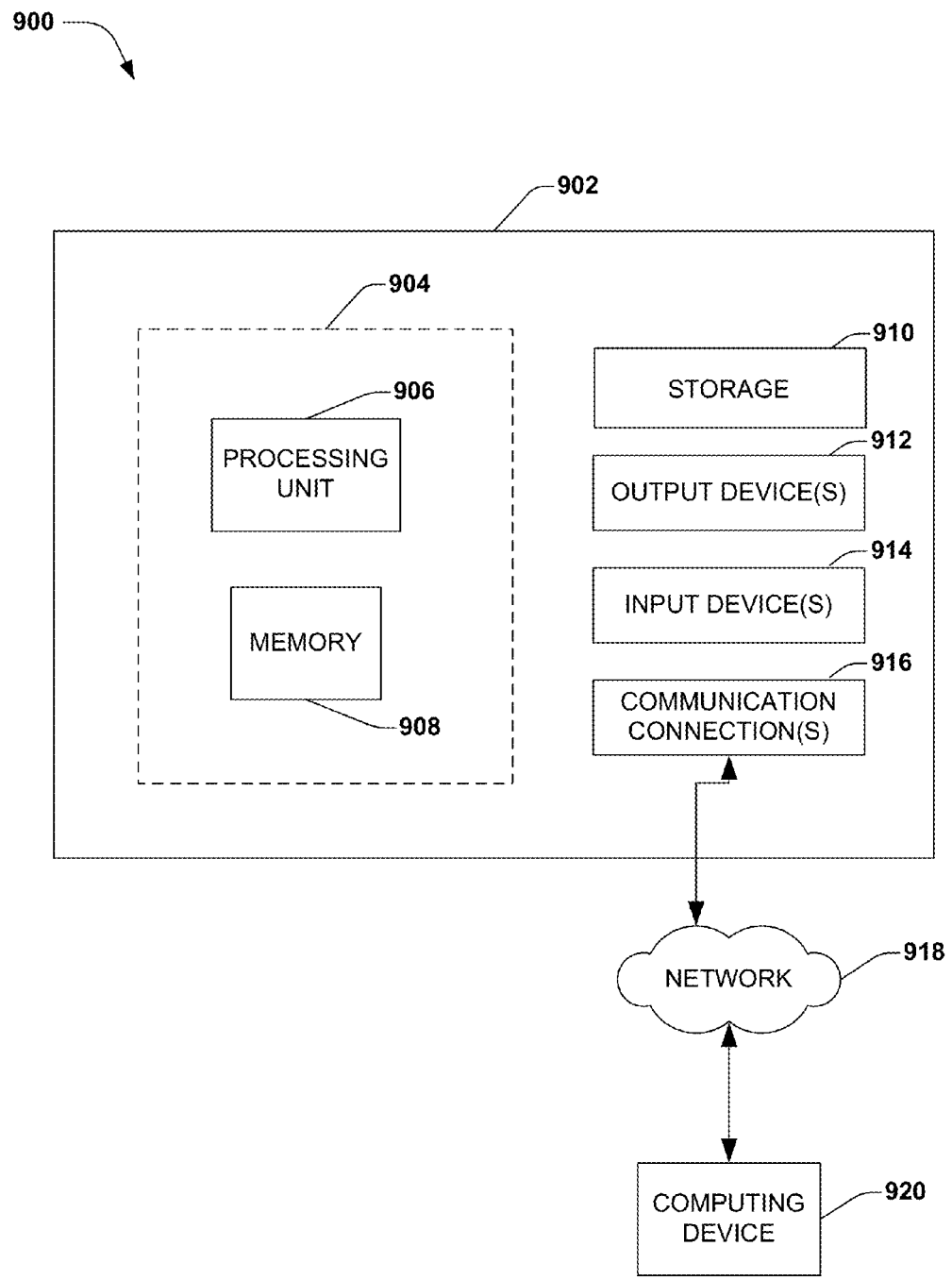
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

F. Usage of Terms

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating an archive comprising at least one block using a device having a processor, a verifier algorithm, and a signing algorithm, the method comprising:
   executing on the processor instructions configured to:
      for respective blocks, using the verifier algorithm, calculate a block verifier of the block;
      generate a block map comprising the block verifiers of respective blocks;
      using the verifier algorithm, calculate a block map verifier of the block map;
      using the signing algorithm, generate a signature including the block map verifier; and
      generate an archive comprising the blocks, the block map, and the signature.

2. The method of claim 1:
   the verifier algorithm comprising a hashing algorithm; and
   the verifier of a block comprising a hashcode of the block calculated using the hashing algorithm.

3. The method of claim 1:
   respective blocks of the archive representing a segment of the object set; and
   calculating the block verifiers of respective blocks comprising: using the verifier algorithm, calculating a block verifier of segments corresponding to respective blocks.

4. The method of claim 1:
   the device comprising at least two verifier algorithms; and
   calculating a verifier of a data set comprising:
      using a first verifier algorithm, calculating a first verifier of the data set; and
      using a second verifier algorithm, calculating a second verifier of the data set.

5. The method of claim 1:
   the signature comprising a signature protected area; and
   generating the signature comprising: generating the signature including the block map verifier in the signature protected area of the signature.

6. The method of claim 1:
   the archive storing an object set comprising at least one object; and
   the signature stored in the archive as an object of the object set.

7. The method of claim 1:
   the archive storing an object set comprising at least one object; and
   respective blocks comprising portions of an object; and
   the block map stored in the archive as an object of the object set.

8. The method of claim 1:
   the instructions configured to, using the verifier algorithm, calculate an object set verifier of the blocks and the block map; and
   generating the signature comprising: generating a signature including the block map verifier and the object set verifier.

9. A method of verifying, using a device having a processor, blocks of an archive including a signature and a block map comprising block verifiers of the blocks of the archive, the method comprising:
   executing on the processor instructions configured to:
      upon receiving a request to extract at least one selected block from the archive:
         extract the selected blocks, the block map, and the signature, and
         store the selected blocks, the block map, and the signature outside of the archive; and
      upon receiving a request to verify at least one extracted block:
         identify an extracted signature including an extracted block map verifier and an extracted block map for the extracted blocks;
         using the signing algorithm, authenticate the extracted signature;
         using the verifier algorithm, verify the extracted block map with the block map verifier; and
         using the verifier algorithm, verify the extracted blocks with the block verifier.

10. The method of claim 9:
    the verifier algorithm comprising a hashing algorithm; and
    the verifier of a block comprising a hashcode of the block calculated using the hashing algorithm.

11. The method of claim 9:
    the device comprising at least two verifier algorithms;
    respective verifiers of a data set comprising:
       a first verifier of the data set calculated using a first verifier algorithm; and
       a second verifier of the data set calculated using a second verifier algorithm; and
    verifying the verifier comprising:
       using the first verifier algorithm, verify the data set using the first verifier; and using the second verifier algorithm, verify the data set using the second verifier.

12. The method of claim 9, the instructions configured to, upon receiving a request to verify at least one selected block within the archive:
extract the selected blocks, the signature, and the block map;
using the signing algorithm, authenticate the signature;
using the verifier algorithm, verify the extracted block map with the block map verifier; and
using the verifier algorithm, verify the extracted blocks with the block verifier.

13. The method of claim 9:
the archive storing an object set comprising at least one object;
respective blocks comprising a portion of an object of the object set;
the request to extract at least one selected block comprising a request to extract the blocks of at least one selected object; and
the request to verify at least one extracted block comprising a request to verify the blocks of at least one extracted object.

14. The method of claim 13, storing the block map and the signature outside of the archive comprising: storing the block map and the signature as extracted objects of the object set.

15. The method of claim 14:
storing the block map and the signature comprising: associating the extracted block map and the extracted signature with extracted objects of the object set; and
identifying the extracted signature and the extracted block map comprising:
identifying the extracted block map and the extracted signature associated with the extracted object.

16. The method of claim 9:
the signature comprising an object set verifier of the blocks and the block map; and
verifying an object comprising: using the verifier algorithm, verify the blocks and the block map of the archive with the object set verifier.

17. The method of claim 9:
the archive accessible to the device over a network; and
the instructions configured to, upon receiving the request to extract the object:
extract a directory, the signature, and the block map; and
after extracting the directory, the signature, and the block map, initiating a data stream of the blocks of the archive; and
the request to verify a selected block of the archive comprising a request to verify a block of the data stream received over the network.

18. The method of claim 9:
the device storing a first version of a data set;
the archive comprising a second version of the data set including a data set update; and
the request to extract the selected blocks of the archive comprising a request to extract the blocks of the archive comprising the data set update.

19. The method of claim 9:
the verifying initiated by a user; and
the instructions comprising: upon detecting a failure of a verification, report the failure to the user.

20. A memory device not comprising an electromagnetic signal, the memory device and storing instructions that enable a device having a processor, a verifier algorithm, and a signing algorithm to generate an archive comprising at least one block, by:
upon being executed by the processor, causing the device to:
for respective blocks, using the verifier algorithm, calculate a block verifier of the block;
generate a block map comprising the block verifiers of respective blocks;
using the verifier algorithm, calculate a block map verifier of the block map;
using the signing algorithm, generate a signature including the block map verifier; and
generate an archive comprising the blocks, the block map, and the signature.

* * * * *